United States Patent [19]

Hill

[11] Patent Number: 4,714,325

[45] Date of Patent: Dec. 22, 1987

[54] MAGNETO-OPTICAL PRINTING HEAD AND METHOD OF GREY-SCALE IMAGE GENERATION USING SUCH A PRINTING HEAD

[75] Inventor: Bernhard Hill, Aachen, Fed. Rep. of Germany

[73] Assignee: U.S. Philips Corporation, New York, N.Y.

[21] Appl. No.: 775,190

[22] Filed: Sep. 12, 1985

[30] Foreign Application Priority Data

Sep. 27, 1984 [DE] Fed. Rep. of Germany ....... 3435426

[51] Int. Cl.$^4$ .............................................. G02F 1/09
[52] U.S. Cl. ................................................... 350/376
[58] Field of Search ....................... 350/355, 376-377; 340/783; 346/108

[56] References Cited

U.S. PATENT DOCUMENTS

| Re. 32,099 | 3/1986 | Hill et al. | 350/377 |
|---|---|---|---|
| 4,449,153 | 5/1984 | Tschang | 346/108 |
| 4,495,492 | 1/1985 | Anderson et al. | 350/377 |
| 4,609,257 | 9/1986 | Shirasaki | 350/355 |

FOREIGN PATENT DOCUMENTS 2754876  6/1979  Fed. Rep. of Germany ...... 350/376

OTHER PUBLICATIONS

Gosch, J., "Magneto-Optics Begets New Display Technology", Electronics, 12-29-81, pp. 53-54.

*Primary Examiner*—William H. Punter
*Attorney, Agent, or Firm*—F. Brice Faller

[57] ABSTRACT

Magneto-optical printing head for generating a grey-scale image on a recording substrate has a magneto-optical light-switching mask with light-switching elements which are switched thermomagnetically by the simultaneous positive or negative effect of heat pulses selectively generated from thin-film resistors applied to the light-switching elements. A magnetic field is applied to a coil between two possible states with in each case the direction of magnetization either parallel or antiparallel to the surface normals, whereby individual time control of the light-switching elements in n possible steps is effected by the single switching of all light-switching elements into the (first) starting state by the action of the positive magnetic field generated by the coil and subsequent switching into the second state by means of a second static magnetic field whose direction is opposite to that of the magnetic field of the coil, and by the action of heat pulses of n−1 point in time. The static magnetic field is generated by an arrangement of permanent magnets situated close to the light-switching elements.

10 Claims, 6 Drawing Figures

MAGNETO-OPTICAL PRINTING HEAD AND METHOD OF GREY-SCALE IMAGE GENERATION USING SUCH A PRINTING HEAD

BACKGROUND OF THE INVENTION

The invention relates to a magneto-optical printing head for generating a picture in the form of at least one line of light spots. The head includes a light source, an imaging optical system and, between that source and imaging optics, a magneto-optical light-switching mask with light-switching elements. By means of head pulses selectively generated from thin-film resistors applied to the light-switching elements and by means of a magnetic field applied over a coil, these elements can be thermomagnetically switched between two possible states with the direction of magnetisation either parallel or antiparallel to the surface normals.

The invention further relates to a method of generating a grey-scale image on a recording substrate using such a head and to the use of the head in an optical printer.

A magneto-optical light switching mask suitable for these purposes is known from DE-PS No. 26 06 596, with the aid of which an electronically controllable high-resolution pattern of light spots can be generated.

From DE-OS No. 28 12 206 a magneto-optical printing head is known which is built up with the aid of a light-switching mask in accordance with DE-PS No. 26 06 596 and which is suitable for line-by-line illumination in an optical line printer.

The basic principle of the known light-switching mask resides in the fact that linearly polarised light upon passing through a thin ferromagnetic and magneto-optical garnet film undergoes a rotation of the plane of polarisation (Faraday rotation). This rotation changes sign when the direction of magnetisation in the film is reversed. In a polarising lens system, formed from a polarisation foil at the light entrance side in front of the mask and an analyser foil at the light exit side behind the mask, the rotation of the plane of polarisation brings about for both states of the direction of magnetisation a reversal of brightness (from light to dark). The thin magneto-optical garnet film is structured in the form of islands on a substrate. It possesses a spontaneous magnetisation which is constantly perpendicular to the surface of the film and hence either parallel or anti-parallel to the surface normals. Switching from one state to another takes place thermomagnetically. To this end a thin-film resistor is deposited by vapour-deposition at a corner of each island, to which a current pulse (heat pulse) is applied. The resultant ohmic heat raises the local temperature, thereby reducing the stability of the magnetisation direction. By means of an external magnetic field, generated for example with a coil, the magnetisation can then be switched into the reverse direction. After cooling within microseconds the new magnetisation direction is again so stable that the renewed application of an external magnetic field produces no further effect. The switching operation lasts typically 20 μs.

For optical printing, switching elements integrated on a substrate are fabricated in mask technology and arranged side by side in a line so that a pattern in the form of a line of light spots can be generated in transmission. For all switching elements of a line the switching magnetic field is applied in common by a coil while heating resistors are controlled individually for the switching elements via integrated switching circuits connected to them.

In optical line printers the individual switching elements are then switched either light or dark for the duration of a line illumination, a switching cycle taking place approximately as follows. An element to be switched to the bright state is at the beginning of an illumination cycle of duration $T_{max}$ switched with a heat pulse $I_n$ and a positive magnetic pulse $H^+$ into the bright state, and at the end of the illumination cycle is switched with a further heat pulse $I_h$ and a negative magnetic field pulse $H^-$ into the dark state. This procedure takes place in parallel for all switching elements of the line that are to be switched into the bright state.

In the known magneto-optical printing head a light-switching mask is arranged in front of a linear light source, such as a fluorescent lamp, a tubular halogen lamp or of a combination of a point light source (e.g. a halogen reflector lamp) and a fibre light guide cross-section converter, which conveys the light from the point light source into a slit exit. The pattern of light spots then produced in transmission behind the light-switching mask is imaged by means of an optical system onto the image plane of a recording substrate. In practice a printing head will contain a number of light-switching lines arranged side by side in modules and imaged by an optical system consisting of several parallel-arranged objectives.

A fundamental problem of such a printing head with parallel generated light spots is that in the image plane there are differences in light intensity between the individual image points, arising from disturbances in the light path due to lens vigneting, to fluctuations in the luminous output of the light source and to variations in the geometry of the light-switching elements in the light-switching mask. These errors of uniformity are normally stationary, that is to say they do not change with time; they amount typically to 20% of the maximum intensity.

Magneto-optical printing heads largely find application in electrophotographic equipment. Such equipment is currently used only for printing text or graphs, i.e. black and white information. For this application the fluctuations of intensity are acceptable since the electrophotographic processes mostly work with very "hard" characteristics, i.e. with steep exposure curves. In the future, however, a grey-scale display will also be necessary, working for example with point-density modulation or with soft recording materials and direct amplitude modulation of the illumination. In addition, other areas of application are gaining in importance in professional printing and film-illumination technologies, where in principle it is also necessary to work with a highly uniform optical illumination.

SUMMARY OF THE INVENTION

The object of the invention is to improve a printing head of the kind mentioned in the preamble in such a way that differences of light intensity between the individual image points are equalised and in addition grey-scale image generation at high speed is made possible.

This object is attained by situating close to the light-switching elements an arrangement for generating a static magnetic field in one direction and a coil whose switchable magnetic field has the opposite direction, whereby the light-switching elements within a line cycle can be individually switched on in n possible steps by the single switching of all light-switching elements into a (first) starting state by the action of the magnetic field generated with the coil and subsequent individual switching of each light-switching element into the second state by the action of head pulses at n−1 points of time and of the static magnetic field.

In another advantageous embodiment of the invention an arrangement of permanent magnets is provided for generating a static magnetic field.

The invention is based on recognition of the fact that, since light-amplitude modulation is fundamentally impossible in magneto-optical switching (only two switching states are possible, bright/dark) control of illumination amplitudes is only possible in terms of time. On the other hand, the effect of light on optically sensitive materials is always dependent on the light intensity and the exposure (illumination) time. A higher light intensity can be compensated by a shorter illumination time. Fundamentally this offers the possibility, by controlling the time that an individual image point in a printing head is illuminated, to correct for fluctuations in light intensity.

Illumination time control within an illumination cycle with the duration $T_{max}$ could be achieved with the known printing head by switching on at the beginning of the illumination cycle all light-switching elements that are to be switched to the "bright" state and then depending on their light intensity, to switch them off again at different times (time-interval modulation). The light-switching element with the lowest light intensity is then not switched off until the end of the cycle at the time $t=T_{max}$. In practice this modulation can be achieved by dividing the total time $T_{max}$ into n equidistant time intervals, beginning by switching on the light-switching elements with a positive magnetic field and corresponding head pulses, and then with magnetic field pulses of reversed polarity individually switching them off with heat pulses at each of the remaining n−1 intervals that are presented. The average number of heat pulses thereby required does not change with n, since each light-switching element is switched only twice within the interval $T_{max}$. The average heat pulse power also remains unchanged. The number of switching operations on the magnetic coil, however, does increase with the number n, that is to say with the grey-scale resolution. With n time intervals corresponding to n different "frey-steps" the coil has to be switched n times (n=2 for the limiting case bright/dark). However, since in practice the switching rate of magneto-optical printing heads is in any case already limited to a few kHz by the power dissipation in the magnetic coil a high grey-scale resolution can only be achieved with this time-interval modulation if the switching rate (optical patterns per unit time) is greatly reduced, in other words a correction of the intensity fluctuations can only be obtained at the expense of a reduced switching rate.

A more advantageous method of time-interval modulation is achieved with a binary stepwise division of the time interval $T_{max}$. With these binary steps the time interval $T_{max}$ is divided into m time intervals t each increasing by the factor 2, thus for example in $t_1=\Delta t$, $t_2=2\Delta t$, $t_3=4\Delta t$ and so on. The division into time intervals thus results in $n=2^m$ different steps (grey scales).

With this method the light-switching elements must be switched on and off in the statistical mean within each second subinterval, which means that the required thermal power rises with the grey-scale resolution. At every time interval the magnetic field must be switched on in the positive direction and then in the negative direction, so that altogether, for m intervals, 2 m switching operations are required, and thus for n grey steps 2×1d(n) switching operations. For the power dissipation of the magnetic coil the procedure from n=4 is more advantageous than the above-mentioned procedure (2×1d(n)>n for n>4). The power dissipation of the magnetic coil is increased by this time-interval modulation by a factor of only $$\frac{2 \times 1d(n)}{2} = 1d(n)$$

compared with n/2.

With the optical printing head in accordance with the invention and the nature of its control practically any grey-scale resolution can now be achieved for the same heating power and with only a doubling of the coil dissipation. For this purpose a permanent magnetic field is generated in the vicinity of the light-switching elements which is oriented parallel to the surface normals in the direction of the switching field $H^-$. This magnetic field can be generated by for example ferromagnets, arranged in a suitable position close to the light-switching elements.

An advantageous embodiment of the invention provides means for optically scanning the light distribution in the image plane of the printing head, which supply correction factors that compensate for the differences of light intensity inherent in the printing head and which are normalised such that, when all light-switching elements are switched into the (first) starting state, a uniform light distribution is present in the image plane of the printing head and whereby the correction factors are stored in an electronic memory.

This has the advantage that the correction factors permanently allocated to the individual switching elements can be used for controlling these elements, whereby the correction factors are advantageously chosen such that a uniform light distribution is produced in the image plane when the bright state is switched on.

A further advantageous embodiment of the invention provides for a digital multiplier in the form of a read-only memory in which all possible products of possible grey-scale values of the light-switching elements and their correction factors can be stored and can be retrieved by direct addressing with the digitally coded grey-scale values and the correction factors and then applied to a time-interval modulation device.

This has the advantage that all possible products of possible grey-scale values and correction values can be permanently stored and retrieved by direct addressing with the digitally coded grey-scale values and the correction factors, so that a real-time multiplication at high speed is made possible.

In a method of grey-scale image generation using a magneto-optical printing head in accordance with the invention, individual time-control of the light-switching elements in n possible steps is effected by the single switching of all light-switching elements into the (first) starting state when the magnetic field of the coil is positive and subsequent switching switching into the second state by the action of a second static magnetic field whose direction is opposite to that of the magnetic field of the coil and by the action of heat pulses at n−1 points of time.

The times at which the individual light-switching elements are switched on are controlled with the aid of correction factors permanently allocated to these light-switching elements, whereby the correction factors are obtained by optical scanning of the uncorrected light distribution in the image plane of the printing head and stored in normalised form in an electronic memory. The formation of correction factors provides the advantage of making it possible to compensate for the differences of light intensity inherent in the printing head.

The grey-scale signals to be displayed on the recording substrate can be multiplied by correction factors permanently stored in an electronic multiplier before being fed to an arrangement for time-interval modulation Thus a read-only memory can be used in which all possible products of possible grey-scale values and correction factors are stored and can be retrieved by direct addressing with the digitally coded grey-scale values and the correction factors.

This has the advantage of making it possible in real time to obtain in one step the product of grey-scale values of the input image information and correction factors at the output of a read-only memory, for example an erasable programmable read-only memory or EPROM.

The optical printing head and the method in accordance with the invention offer and the advantages that, with the heating power remaining constant, only double the coil power is needed and that time-interval control of the switching elements that form the image points can be used for grey-scale modulation of the image points in order to display grey-scale values. Thus the differences of light intensity inherent in the printing head are compensated by permanently stored correction values which, multiplied by the grey-scale values, are fed to an arrangement for time-interval modulation.

A special advantage is that the optical printing head in accordance with the invention operates at high switching rates without any significant increase of power dissipation in the heating elements and the magnetic coil.

DETAIL DESCRIPTION OF THE INVENTION

Figure 1:
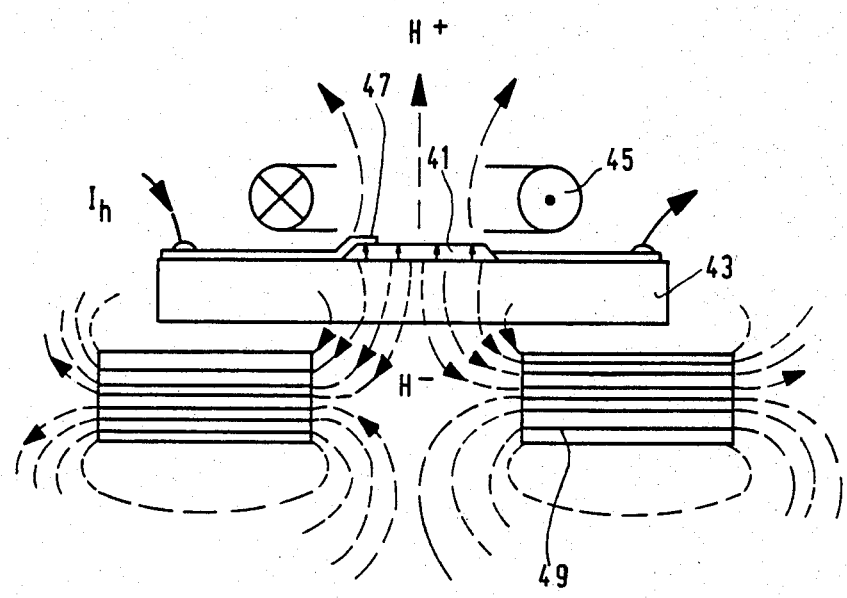
FIG. 1 shows a section of a light-switching line.

FIG. 1 represents a light-switching mask with a light-switching element 41 integrated on a substrate 43. For optical printing applications many switching elements are integrated on a substrate fabricated in mask technology and arranged for example in a line so that a picture in the form of a line of light spots can be generated in transmission in a polarising optical system.

Figure 2:
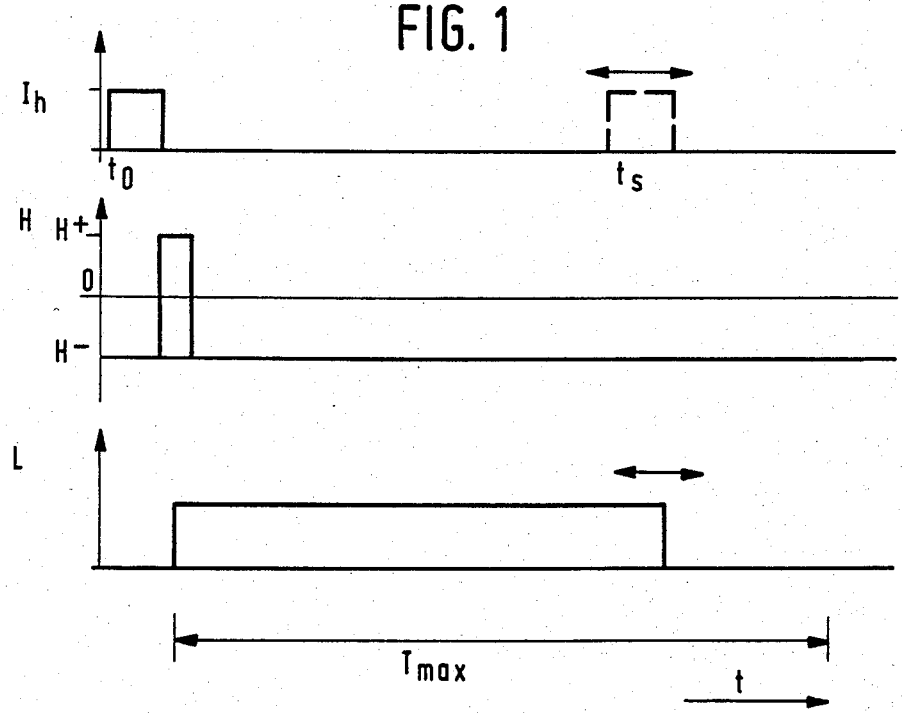
FIG. 2 shows a switching cycle of a light-switching line.

FIG. 1 shows a section of such a light-switching line. The light-switching element 41 posesses spontaneous magnetisation which is oriented perpendicular to the main surfaces of the element 41 and is either parallel or antiparallel to the surface normals. Switching from one of these states into the other takes place thermomagnetically. To this end a thin-film resistive element serving as a heating resistor 47 is deposited on the light-switching element 41, through which resistor a current pulse (heat pulse) $I_h$ is passed. The resultant ohmic heat raises the local temperature. The increased temperature reduces the stability of the direction of magnetisation. By means of an external magnetic field generated with a coil 45 the magnetisation can then be switched into the reverse direction. After cooling within microseconds, the new direction is again so stable that the renewed application of an external magnetic field no longer produces any effect. For all light-switching elements 41 arranged in a line the switching magnetic field is applied collectively over the coil 45, while the heating resistors 47 on the light-switching elements 41 are individually controlled by means of integrated switching circuits that are connected to them. An arrangement of permanent magnets 49 generates a permanent magnetic field which is oriented parallel to the surface normals of the light-switching elements 41 in the direction of the switching field $H^-$. This magnetic field can be generated by ferromagnets arranged in a suitable position close to the light-switching elements 41. The permanent magnetic field makes it possible to switch the light-switching elements 41 at any time by means of a heat pulse $I_h$. The procedure for modulation of the illumination time is illustrated in FIG. 2. At the beginning of the illumination cycle of duration $T_{max}$, using a light source L, a magnetic coil 45 generates a positive magnetic field pulse $2H^+$ which is twice as large as the negative permanent magnetic field $H^-$; the light-switching elements 41 are thereupon switched into the direction $H^+$. At any time thereafter reverse switching is possible by means of heat pulses $I_h$ only without a coil field, thus producing any required grey-scale resolution. Since the magnetic coil 45 has to be driven at the beginning of the cycle with twice the current used for the known switching cycle, the power dissipation is four times as high as in the known switching procedure. The average increase in power is 4/2, i.e. twofold.

This switching procedure can be used for building a printing head with illumination correction. For this purpose a memory allocated to the printing head stores all the illumination-time correction values allocated to each light-switching element of the printing head. The input data information (in black-and-white printers a sequence of zeroes and ones) is linked with the correction values, and the correction values have to be taken over only for the bright position of a switching element. From the correction values a sequence of pulse patterns is then generated in a decoder and control network (mask control) so that each light-switching element to be switched into the bright state is switched on at the beginning and switched off again at a point in time corresponding to the correction values. The magnetic coil is switched on only once by a pulse at the beginning of a cycle.

Figure 3:
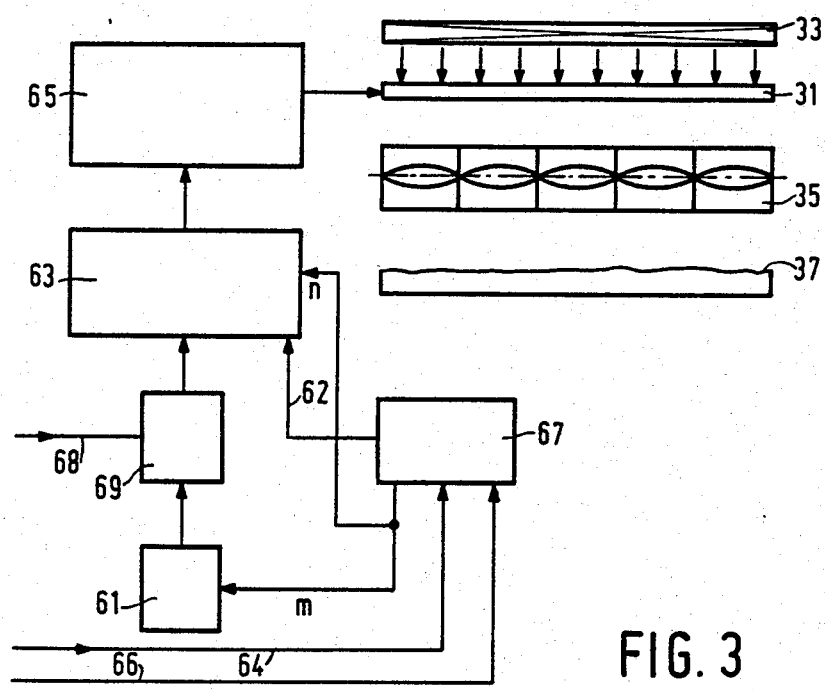
FIG. 3 shows a schematic structure of an optical printing head with digital control.

The basic diagram in FIG. 3 represents the structure of such an optical printing head with digital control. The correction values of the light-switching elements, coming from an address counter 67 driven by sync signals 64 and an external clock 66, are stored in pulse-code modulation (PCM) in an EPROM 61. With the data information "1" they are first linked in a logic "AND member" 69 and are then taken over in a converter 63, for example a PCM/DPLM converter (DPLM=digital pulse-length modulation) with line store, to which the address counter 67 also supplies a clock signal 62, and are then stored for the period of one line of image points. The arrow 68 indicates the input pattern of lines.

At the same time the correction values are stored in parallel as for example words in PCM code, for instance as 7-bit words (=128 steps) to obtain an accuracy better than 1%. From the stored line a succession of n heat pulse patterns is then derived (n=128 for 7-bit words) and fed to the printing head comprising a light-switching mask 31, a linear light source 33, an optical system 35 and the image plane 37 of a recording substrate, so that the light-switching elements can be switched on or off at the appropriate points of time. The pulse patterns thus obtained control the magneto-optical light-switching masks 31 of the printing head by means of a mask control arrangement 65.

Figure 4:
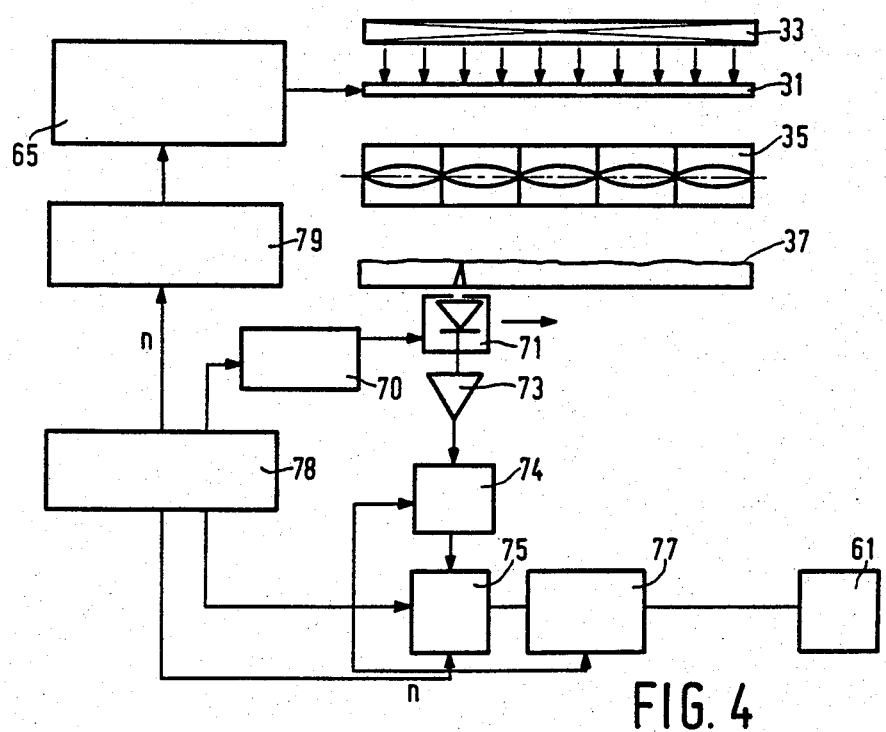
FIG. 4 shows a circuit arrangement for obtaining correction factors.

The correction factors are obtained by means of an arrangement as illustrated in FIG. 4. The printing head with the light-switching mask 31, the linear light source 33, the optical system 35 and the recording substrate with image plane 37 is driven by switching on only one light-switching element at a time. The luminous power of this light-switching element is measured in the image plane 37 with a photodetector 71, after which it is electronically amplified by an amplifier 73, digitised in an analog/digital converter 74 and fed to a store 75. The next light-switching element is then switched on, and so on until all light-switching elements have been detected and their luminous powers stored. All the values thus determined are then taken over in a calculator 77 (e.g. a personal computer) and the smallest value is established. All values are then normalised to the smallest value. The reciprocal values thereof, allocated as correction values to the image point addresses, are stored in an EPROM 61. The switching elements 65 (mask control), 78 image point counter and clock) and 79 (test pattern generator) shown in FIG. 4, serve for generating the patterns of light spots in the printing head and for controlling the scanning of the patterns in accordance with the procedure described in the foregoing. A motor 70 drives the photodetector 71.

The arrangement shown by way of example in FIG. 4 represents the arrangement used for calibrating each printing head. The EPROM for each head contains all correction values for that head and forms part of the printing-head control system (e.g. as shown in FIG. 3).

The embodiment shown in FIG. 3 can be used for generating light/dark patterns for text and graphic displays with correction of the illumination energy of the light-switching elements.

Figure 5:
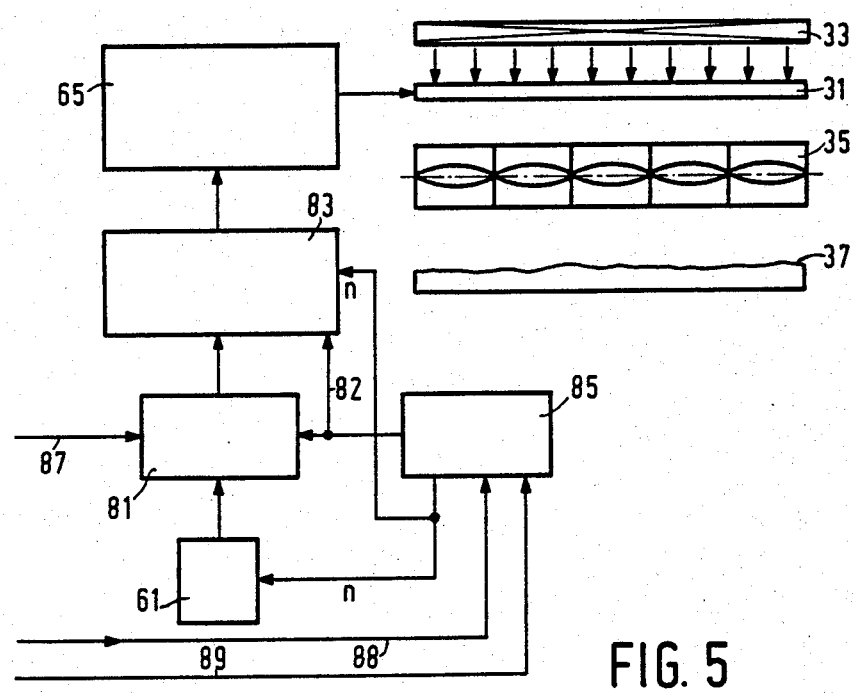
FIG. 5 shows a printing-head control circuit.

Referring to FIG. 5, the embodiment of FIG. 3 can easily be extended to a printing head for a grey-scale display, working with amplitude modulation of the luminance energy of the light-switching elements. For the picture information to be printed, PCM-coded grey values (arrow 87) have to be multiplied by the correction values from the EPROM memory 61 in a multiplier 81 and then fed to a decoder 83 (PCM/DPLM converter with line store) for conversion into n heat pulse patterns. Via the mask control circuit 65 the products of the correction and grey-scale values are fed to the printing head (31, 33, 35, 37).

Synchronisation is performed by means of an address counter 85 which, driven by line sync signals 88 and an external clock 89, supplied to the memory 61 and to the PCM/DPLM converter 83 the successive image point addresses m and supplies to the multiplier 81 and to the PCM/DPLM converter 83 a clock signal 82. Modulation of the illumination energy is then possible in a raster of m values. Of course, the dynamic range of the grey-scale values is limited by the range of the correction values for compensating the fluctuations of intensity inherent in the printing head. If a display in 256 grey values corresponding to 256 time intervals within an illumination cycle (8-bit display) is used and if 25% of this range is needed for compensating the intensity fluctuations in accordance with 64 possible correction values, then only 192 possible grey values remain for the effective grey-scale display. A more advantageous utilisation can be achieved using a statistical method.

In practice high switching rates are required for the generation of image point patterns. Typical data rates for image point information lie in the range of Mbit/s.

Figure 6:
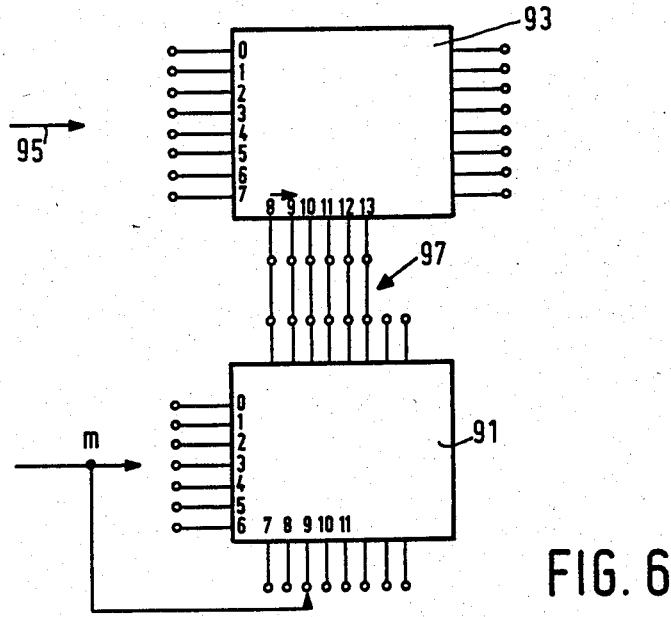
FIG. 6 shows part of the control circuit of FIG. 5.

This imposes high demands on the multiplier 81 in FIG. 5. A simple solution for this is illustrated in FIG. 6. In this case all possible combinations of the grey-scale values are stored together with the correction values (e.g. 192 grey steps with 64 correction values gives a total of 12288 values) in digital multiplier in the form of a read-only memory 93 and are directly addressed with the PCM grey-scale values of the input image point information 95 and the correction values 97, which are stored in an EPROM memory 91. These correction values together with the image point address m are retrieved from the memory 91. In this way it is possible in real time to obtain the product at the output of the memory 91 in a single step. For the example given here it is sufficient to use an EPROM with 128 kbit, organised in 16K levels with 8 bits parallel in each level.

What is claimed is:

1. Magneto-optical printing head for generating a picture in the form of at least one line of light spots, comprising a light source, an imaging optical system and, situated between the source and imaging optics, a magneto-optical light-switching mask with light-switching elements, which by means of heat pulses selectively generated from thin-film resistors applied to the light-switching elements, and by means of a coil generating a magnetic field can be thermomagnetically switched between two possible states with the direction of magnetisation either parallel or antiparallel to the surface normals, characterized by an arrangement situated close to the light-switching elements for generating a static magnetic field in one direction, said coil generating a switchable magnetic field in the opposite direction, whereby the light-switching elements within a line cycle can be individually switched on in n possible steps by the single switching of all light-switching elements into a (first) starting state by the action of the magnetic field generated with the coil and subsequent individual switching of each light-switching element into the second state by the action of heat pulses at n−1 points of time and of the static magnetic field.

2. Magneto-optical printing head as claimed in claim 1, characterized in that the arrangement for generating a static magnetic field is an arrangement of permanent magnets.

3. Magneto-optical printing head as claimed in claim 1 wherein means are provided for optically scanning the light distribution in the image plane of the printing head which supply correction factors that compensate for the differences of light intensity inherent in the printing head and which are normalised such that, when all light-switching elements are switched into the (first) starting state, a uniform light distribution is present in the image plane of the printing head.

4. Magneto-optical printing head as claimed in claim 3, characterized in that the correction factors are stored in an electronic memory.

5. Magneto-optical printing head as claimed in any claim 1, characterized by a digital multiplier in the form of a read-only memory in which all possible products of possible grey-scale values of the light-switching elements and their correction factors are stored and can be retrieved by direct addressing with the digitally coded grey-scale values and the correction factors and then applied to a time-interval modulation device.

6. Method of grey-scale image generation on a recording substrate using a magneto-optical printing head comprising a light source, an imaging optical system, a magneto-optical light switching mask therebetween having a line of light switching elements with thin film resistors applied thereto, a coil for generating a magnetic field in one direction normal to the surface of the elements, and an arrangement close to the light switching elements for generating a static magnetic field in the opposite direction normal to the surface of the elements, said method comprising the following steps generating a heat pulse in the thin film resistors and generating a magnetic field with the coil to switch all the light switching elements into a starting state, subsequently selectively generating heat pulses in the thin film resistors at $n-1$ points in time, whereby the light switching elements in a line cycle can be individually switched to a second state in n possible steps by the action of the heat pulses and the static magnetic field.

7. Method as claimed in claim 6 wherein the times at which the individual light-switching elements are switched on are controlled with the aid of correction factors permanently allocated to these light-switching elements, whereby the correction factors are obtained by optical scanning of the uncorrected light distribution in the image plane of the printing head and store in normalised form in an electronic memory.

8. Method as claimed in claim 7, characterized in that the correction factors are normalised in such a way that when the light-switching elements are switched into the (first) starting state a uniform light distribution is present in the image plane of the recording substrate.

9. Method as claimed in claim 8, characterized in that the grey-scale signals to be displayed on the recording substrate are multiplied by the correction factors permanently stored in an electronic multiplier before being fed to an arrangement for time-interval modulation.

10. Method as claimed in claim 9, characterized in that a read-only memory is used as multiplier in which all possible products of possible grey-scale values and correction factors are stored and can be retrieved by direct addressing with the digitally coded grey-scale values and the correction factors.

* * * * *